United States Patent [19]

Kitazawa et al.

[11] Patent Number: 4,998,172
[45] Date of Patent: Mar. 5, 1991

[54] SECONDARY BEAT SIGNAL CANCEL CIRCUIT

[75] Inventors: Toshihiko Kitazawa; Ichitaro Sato, both of Kanagawa, Japan

[73] Assignee: Sony Corporation, Tokyo, Japan

[21] Appl. No.: 61,050

[22] Filed: Jun. 16, 1987

Related U.S. Application Data

[63] Continuation of Ser. No. 643,371, Aug. 23, 1984, abandoned.

[30] Foreign Application Priority Data

Aug. 31, 1983 [JP] Japan ................................ 58-159461

[51] Int. Cl.$^5$ ............................................... H04N 9/79
[52] U.S. Cl. .................................. 358/328; 358/315; 360/34.1
[58] Field of Search ............... 358/315, 316, 318, 327, 358/328, 310, 335, 336; 360/33.1, 34.1

[56] References Cited

U.S. PATENT DOCUMENTS

| 3,626,087 | 12/1971 | Tomioka | 358/318 X |
| 3,660,596 | 5/1972 | Numakura | 358/328 |
| 3,715,468 | 2/1973 | Fujita | 358/328 |
| 3,728,475 | 4/1973 | Inoue et al. | 358/327 |
| 3,730,983 | 5/1973 | Numakura et al. | 358/328 |
| 3,893,168 | 7/1975 | Bechly et al. | 358/327 X |

FOREIGN PATENT DOCUMENTS 56-96590 8/1981 Japan.
57-3486 8/1982 Japan .................................. 358/328

OTHER PUBLICATIONS

Hobbs, M., Servicing Home Video Cassette Recorders, 1982, pp. 31–41.
Sony Basic Video Recording Cource, Tape Formats, 1979, pp. 3–6 and 10–11.

Primary Examiner—Aristotelis M. Psitos
Assistant Examiner—W. R. Young
Attorney, Agent, or Firm—Lewis H. Eslinger

[57] ABSTRACT

A magnetic reproducing apparatus is provided with an improved secondary beat signal cancel circuit for reducing a secondary beat signal of a low-frequency converted chroma signal leaked into a reproduced luminance signal without deteriorating vertical resolution at the edge of an oblique check signal. The secondary beat signal cancel operation is interrupted during a period in which no vertical correlation exists between the edge portions of two succeeding horizontal lines of the oblique check signal.

4 Claims, 6 Drawing Sheets

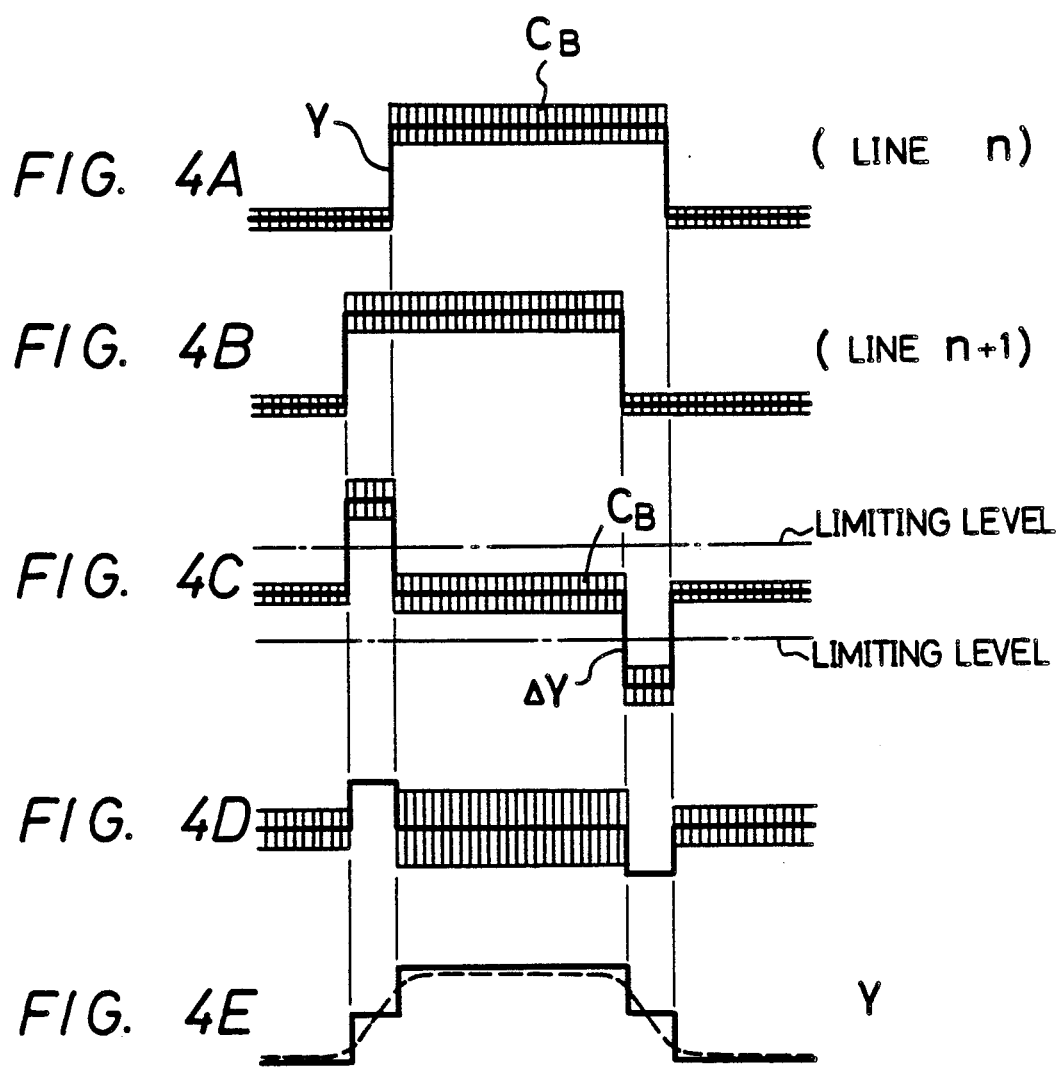

SECONDARY BEAT SIGNAL CANCEL CIRCUIT

This is a continuation of application Ser. No. 06/643,371, filed Aug. 23, 1984, now abandoned.

BACKGROUND OF THE INVENTION

1. Field of the Invention

The present invention relates to a secondary beat signal cancel circuit suitable for use in a VTR (video tape recorder) in which a low-frequency converted carrier chrominance signal is recorded together with a luminance signal on a magnetic tape.

2. Description of the Prior Art

In a VTR (video tape recorder) in which a carrier chrominance signal is converted to a low frequency and then recorded together with a luminance signal on a magnetic tape, the tape - rotary magnetic head system has a non-linear characteristic, namely a tertiary curve characteristic, so that, as shown in FIG. 1, a secondary beat signal component $C_B$ of the low-frequency converted carrier chrominance signal C leaks into the luminance signal Y. The signals are recorded on the magnetic tape in that state. Upon reproducing, because of the secondary beat signal component $C_B$, an oblique beat pattern appears on the picture screen and thereby the picture quality is deteriorated greatly. Particularly when the level of the chroma signal is large, the deterioration of the picture quality is substantial.

Therefore, in the prior art, a reproducing system of the VTR is generally provided with a secondary beat signal cancel circuit which cancels the secondary beat signal component $C_B$. FIG. 2 is a circuit block diagram showing an example of such prior art secondary beat signal cancel circuit.

In FIG. 2, a luminance signal Y and a low-frequency converted carrier chrominance signal C which are reproduced by a magnetic head H are supplied through a pre-amplifier 1 to a band pass filter 2 by which the low-frequency converted carrier chrominance signal C is separated from the luminance signal Y. This low-frequency converted carrier chrominance signal C is supplied to a frequency converting circuit 3 and then fed to a demodulator 4 which generates a pair of component chrominance signals, for example, red and blue color difference signals R - Y and B - Y.

The output signal from the pre-amplifier 1 is further supplied to a high pass filter 6 by which the luminance signal Y is separated from the carrier chrominance signal C. The luminance signal Y is then supplied to a demodulator 7 in which it is FM (frequency modulation) - demodulated. Thereafter, the FM-demodulated luminance signal Y is supplied to a secondary beat signal cancel circuit 10 in which the secondary beat signal component $C_B$ contained in the luminance signal Y is cancelled out. Thus, the luminance signal Y having no secondary beat signal component $C_B$ is delivered to a terminal 8.

The secondary beat signal cancel circuit 10 includes a non-correlation signal detecting circuit 11. The non-correlation signal detecting circuit 11 consists of a delay circuit 12 supplied with the output of the demodulator 7 and delaying the same by one horizontal period (1H), an inverter 13 supplied with the output of the delay circuit 12 and an adding circuit 14 which adds the present luminance signal from the demodulator 7 and the luminance signal delayed by 1H from the inverter 13. Accordingly, from the adding circuit 14 a non-correlation signal is derived which includes the secondary beat signal component $C_B$ contained in the luminance signal Y and an edge signal $\Delta Y$ (a signal corresponding to an edge portion of the luminance signal Y) upon vertical correlation. When the vertical correlation exists, no edge signal $\Delta Y$ is produced.

The non-correlation signal formed of the secondary beat signal component $C_B$ and the edge signal $\Delta Y$ is supplied through a band pass filter 15 to a limiting amplifier 16 which limits the portion of the edge signal $\Delta Y$ having a level higher than a predetermined level. The non-correlation signal which is limited as above is supplied to a level control circuit 17 in which the level thereof is controlled by an envelope-detected output of the carrier chrominance signal produced from an envelope detecting circuit 19 which is supplied with the carrier chrominance signal C from the band pass filter 2. Then, the non-correlation signal from the level control circuit 17 is supplied to a subtracting circuit 18 in which the non-correlation signal is added to the present luminance signal from the demodulator 7 with polarities as shown in FIG. 2. Reference numeral 30 denotes a delay element which is connected between the demodulator 7 and the subtracting circuit 18 to compensate for the delay time caused by the interposition of the band pass filter 15, the limiting amplifier 16 and so on.

The level control circuit 17 is adapted to control the level of the non-correlation signal to become such a level as to cancel the secondary beat signal component $C_B$ contained in the luminance signal Y.

When the vertical correlation exists, no edge signal $\Delta Y$ is produced from the adding circuit 14 so that at this time, the level control circuit 17 produces only the secondary beat signal component $C_B$ the level of which, is controlled on the basis of the envelope-detected output; thus the edge portion of the present luminance signal is not deteriorated at all.

However, when a color picture image of an oblique stripe pattern as, for example, shown in FIG. 3 is recorded, no vertical correlation exists between the edge portions of two succeeding horizontal lines, for example, n and n+1 so that in this case, the edge signal $\Delta Y$ is also produced together with the secondary beat signal component $C_B$. Then, the edge signal $\Delta Y$ is controlled in level on the basis of the envelope-detected output too, so that the edge signal $\Delta Y$ is subtracted from the present luminance signal Y and thus the edge portion of the present luminance signal Y is deteriorated.

When the color picture image as, for example, shown in FIG. 3 is recorded, a signal as shown in FIG. 4B is produced as the present luminance signal Y on the horizontal line, for example n+1, and the 1H delay circuit 12 produces the luminance signal Y of the horizontal line n (FIG. 4A). As a result, from the adding circuit 14 a secondary beat signal $C_B$ is derived containing an edge signal $\Delta Y$ as shown in FIG. 4C. This edge signal $\Delta Y$ is limited by the limiting amplifier 16 and thus a non-correlation signal as shown in FIG. 4D is derived.

The level control circuit 17 carries out the control operation so that when the envelope-detected output of the carrier chrominance signal is large in level, the output level becomes large in correspondence therewith. Accordingly, when the color picture image contains, for example, much color components and the amplitude of the luminance signal is small, the amount of the edge signal $\Delta Y$ subtracted from the luminance signal Y in the subtracting circuit 18 is increased. As a result, a luminance signal Y in which the edge portion is deteriorated as shown in FIG. 4E is produced at the terminal 8, thus resulting in poor reproducibility of the edge portion of the luminance signal and the picture image having an obscure edge.

OBJECTS AND SUMMARY OF THE INVENTION

Accordingly, it is an object of the present invention to provide an improved secondary beat signal cancel circuit.

It is another object of the present invention to provide a secondary beat signal cancel circuit capable of completely cancelling a secondary beat signal component.

It is a further object of the present invention to provide a secondary beat signal cancel circuit capable of surely preventing an edge portion of a luminance signal from being deteriorated in its cancel operation.

It is a still further object of the present invention to provide a secondary beat signal cancel circuit suitable for use in a video tape recorder in which a low-frequency converted carrier chrominance signal is recorded together with a luminance signal on a magnetic tape.

According to one aspect of the present invention, there is provided a circuit for reducing a secondary beat signal of a low-frequency converted chrominance signal leaked into a reproduced luminance signal, said secondary beat signal being produced due to the transformation of said luminance and chrominance signals through a non-linear transmission medium comprising:

(a) means for deriving a secondary beat signal and a non-correlation signal indicating a difference between succeeding horizontal line signals from said reproduced luminance signal which includes said secondary beat signals;

(b) means for detecting an amplitude of said chrominance signal of a reproduced video signal;

(c) means for controlling an amplitude of said secondary beat signal in response to said detected amplitude of said chrominance signal;

(d) means for subtracting said controlled amplitude of said secondary beat signal from said reproduced luminance signal; and (e) means for controlling an operation of said subtracting means in response to said non-correlation signal.

The other objects, features and advantages of the present invention will become apparent from the following description taken in conjunction with the accompanying drawings through which the like references designate the same elements and parts.

BRIEF DESCRIPTION OF THE DRAWINGS

FIGS. 3 and FIGS. 4A to 4E are respectively diagrams useful for explaining the operation thereof;

DESCRIPTION OF THE PREFERRED EMBODIMENT

Figure 1:
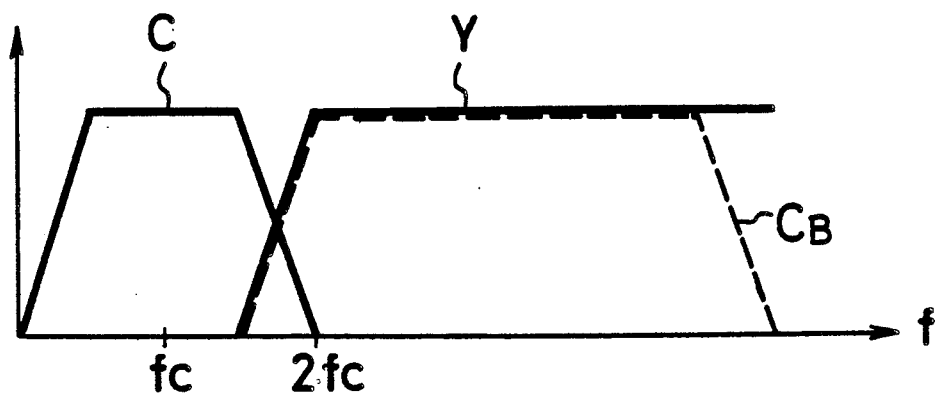
FIG. 1 is a diagram showing a frequency spectrum of a color video signal.
Figure 3:
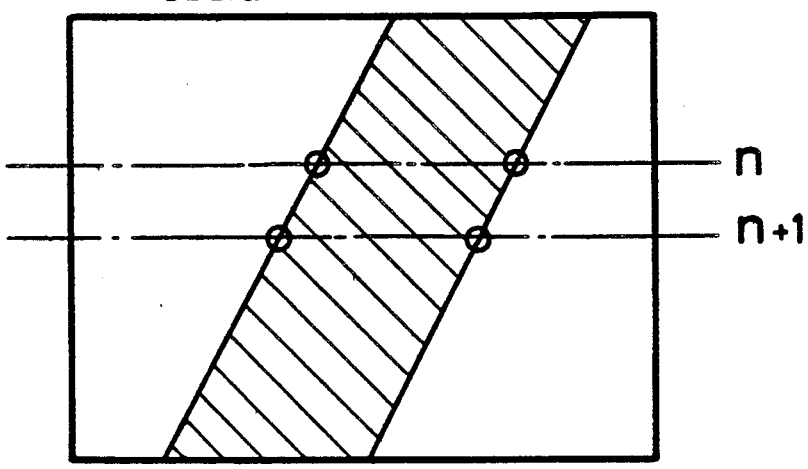
Figure 2:
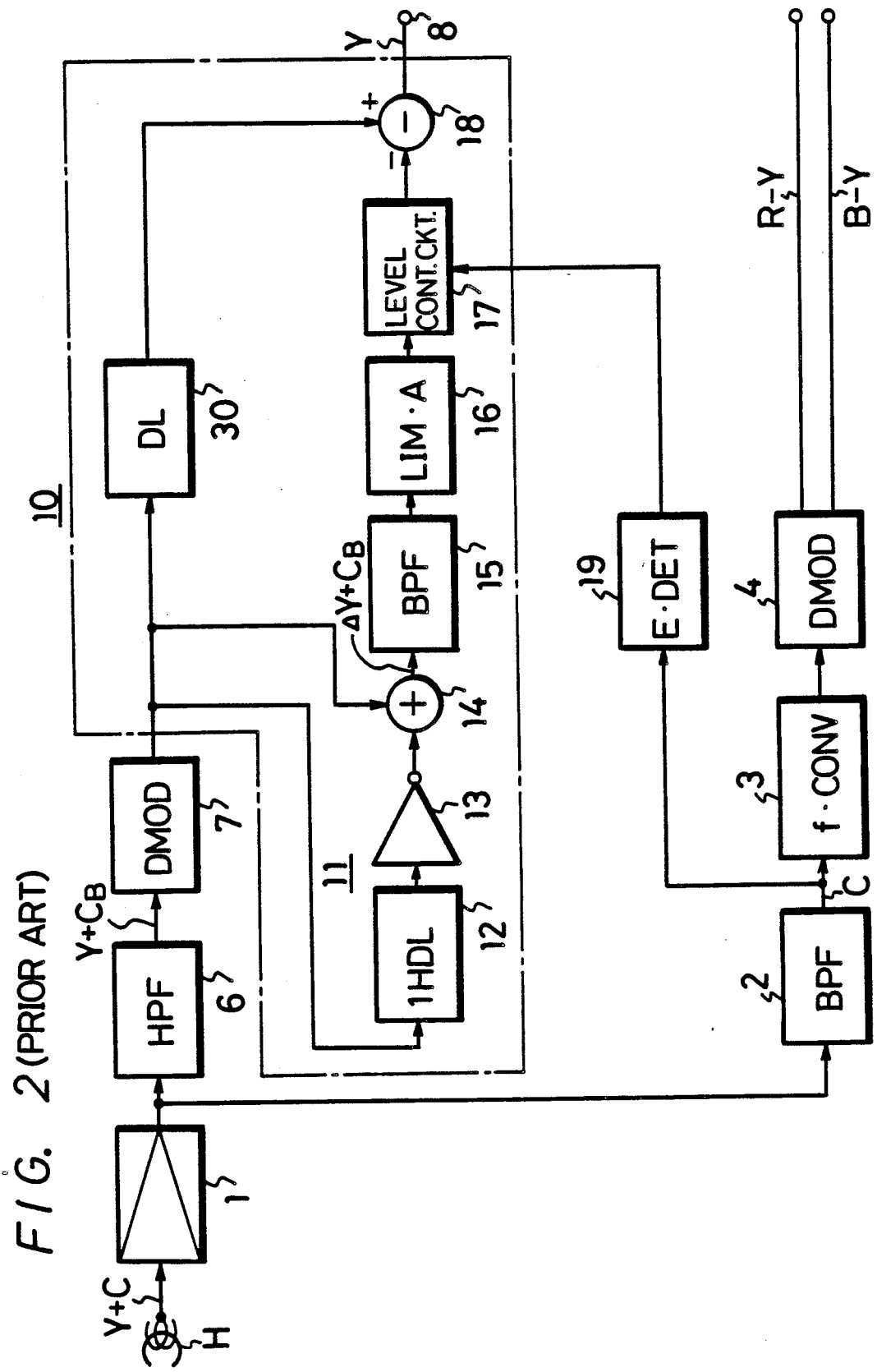
FIG. 2 is a schematic block diagram showing an example of a prior art secondary beat signal cancel circuit.
Figure 5:
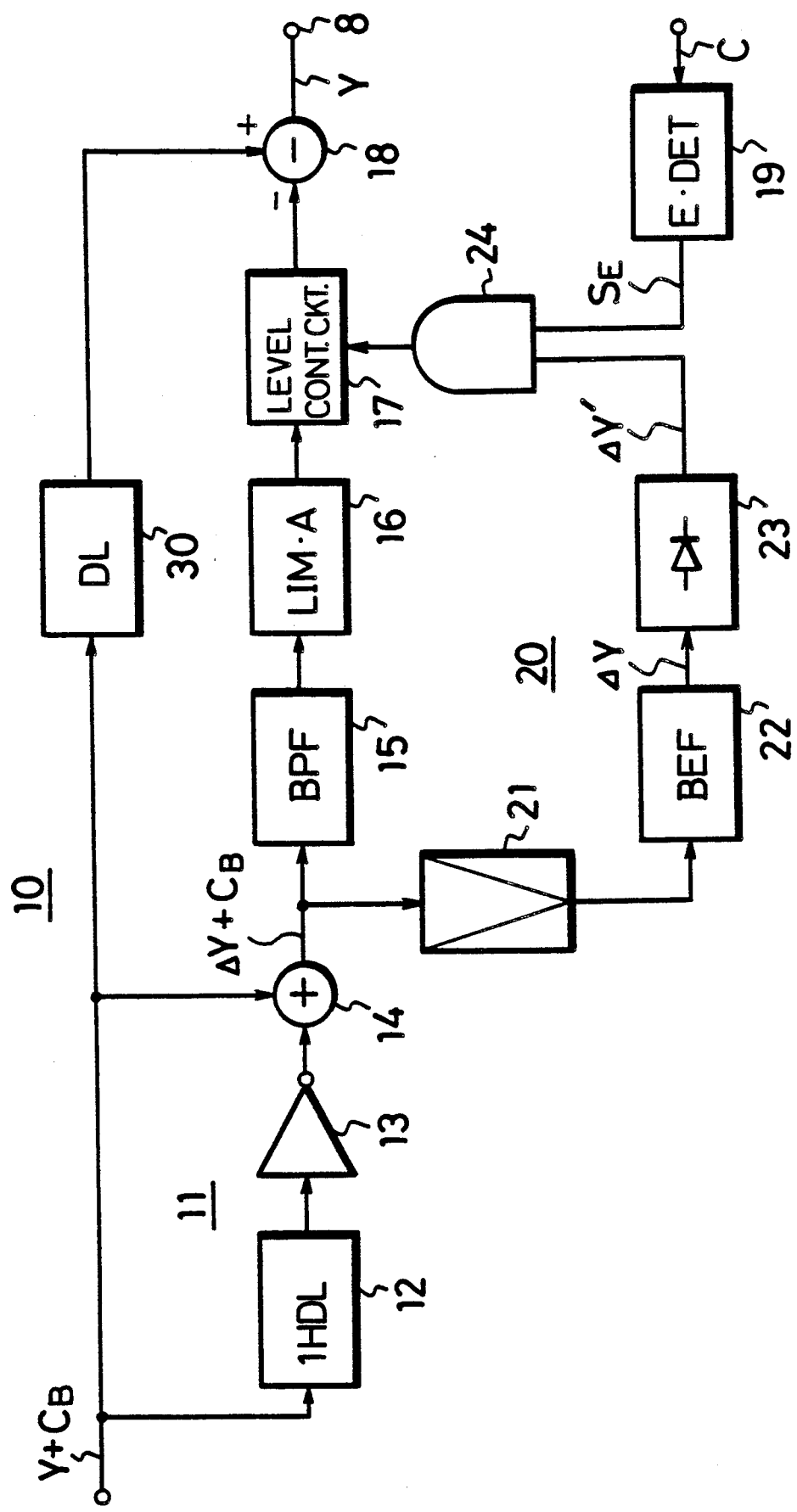
FIG. 5 is a schematic block diagram showing an embodiment of a secondary beat signal cancel circuit according to the present invention.
Figure 6:
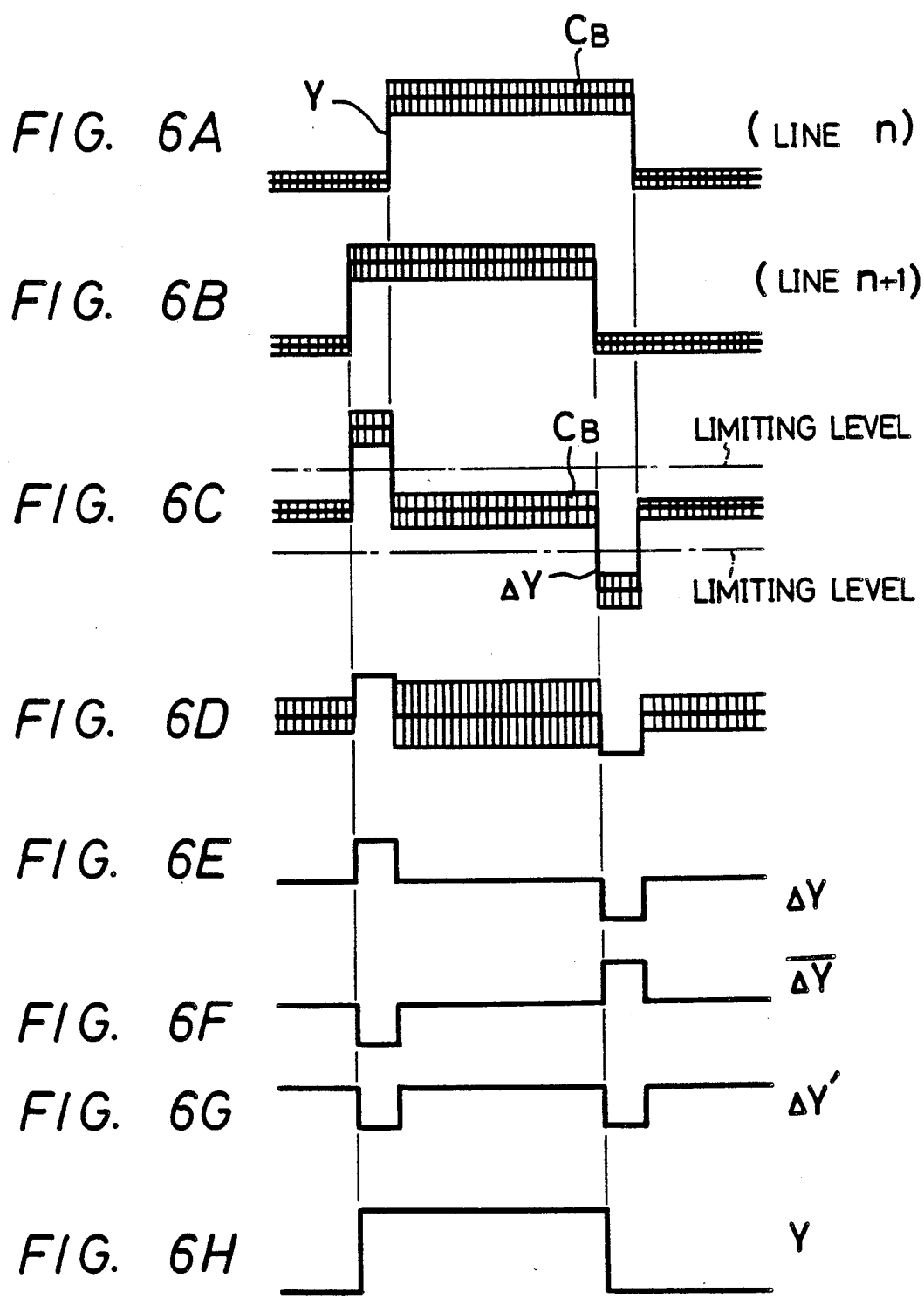
FIGS. 6A to 6H are respectively waveform diagrams useful for explaining the operation thereof.

Now, an embodiment of a secondary beat signal cancel circuit according to the present invention will hereinafter be described in detail with reference to FIGS. 5–7 and the following description. FIG. 5 is a circuit block diagram of the secondary beat signal cancel circuit of the invention. In FIG. 5, like parts corresponding to those in FIG. 2 are marked with the same references and will not be described in detail.

In FIG. 5, reference numeral 20 designates an inhibiting circuit which carries out such level control that, when the edge signal $\Delta Y$ is produced, the level control state becomes minimum or zero. To this end, the non-correlation signal from the adding circuit 14 is supplied through an amplifier 21 to a band-eliminating filter 22 which eliminates the secondary beat signal component $C_B$ contained in the non-correlation signal. The edge signal $\Delta Y$ (FIG. 6E) delivered from the band-eliminating filter 22 is supplied to a full-wave rectifier 23 and thereby rectified in full-wave. The full-wave rectified output $\Delta Y'$ (FIG. 6G) from the full-wave rectifier 23 is supplied together with the envelope detected output $S_E$ of the carrier chrominance signal C from the envelope-detecting circuit 19 to an AND circuit 24 and the AND output therefrom is supplied to the level control circuit 17 as its level control signal.

The output $\Delta Y'$, which is rectified in full-wave so as to be a pulse of negative polarity, is used as an AND gate pulse for the AND circuit 24. Accordingly, during the period in which the edge signal $\Delta Y$ is delivered, the envelope-detected output $S_E$ is not supplied to the level control circuit 17 so that at this time, no non-correlation signal is delivered from the level control circuit 17. Thus the non-correlation signal is not subtracted from the present luminance signal during this period.

On the other hand, during periods other than the edge portions, the envelope-detected output $S_E$ itself is supplied through the AND circuit 24 to the level control circuit 17 so that the level of the non-correlation signal is controlled in accordance with the level of the envelope-detected output $S_E$. As a result, at that time, a secondary beat signal cancel operation similar to that described in connection with FIG. 2 is carried out.

In consequence, the luminance signal Y produced at the terminal 8 has an edge portion exactly the same as that of the present luminance signal as shown in FIG. 6H. Thus, the secondary beat signal cancel operation does not cause the edge portion to be deteriorated.

Figure 7:
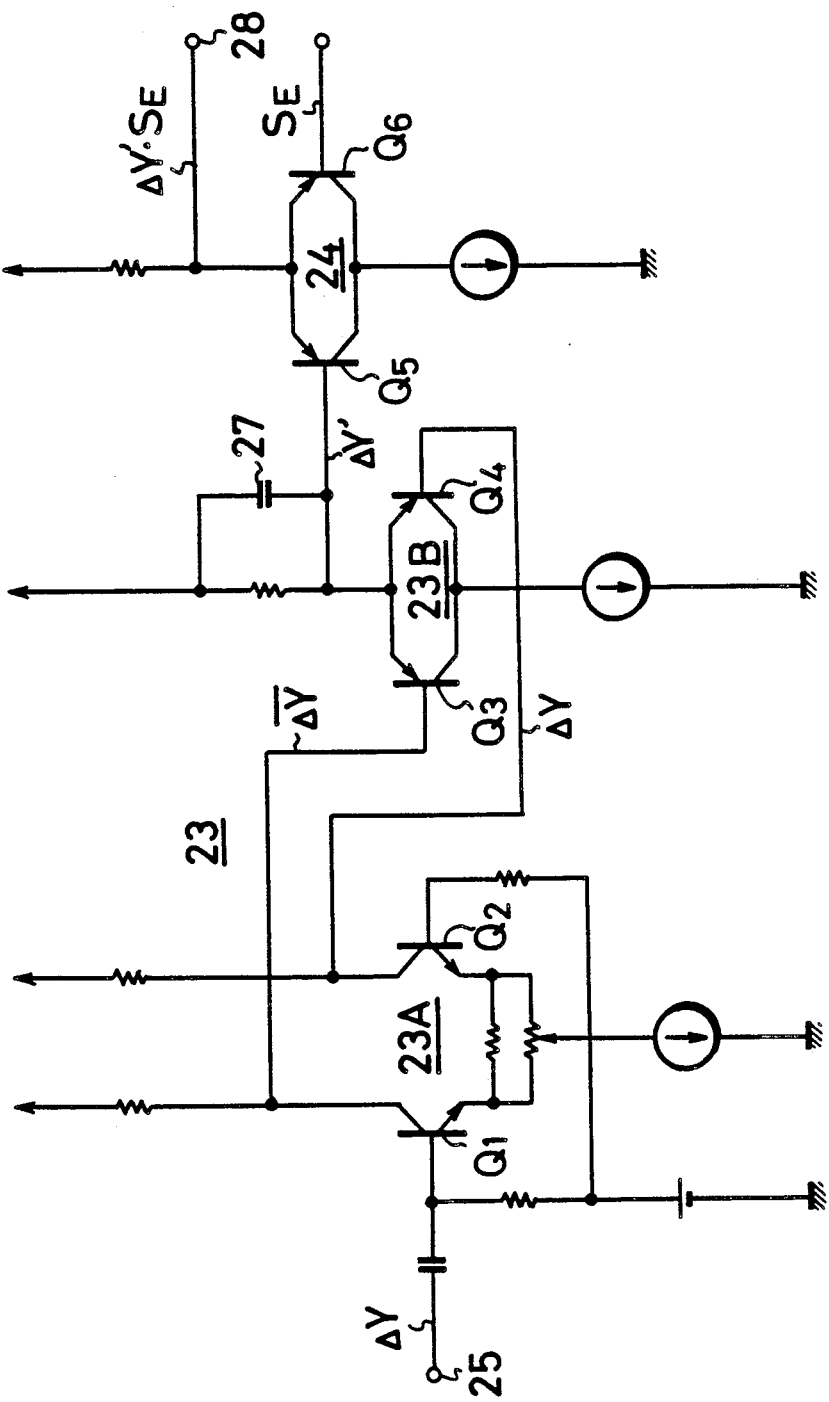
FIG. 7 is a diagram showing a practical example of an inhibiting circuit used in the present invention shown in FIG. 5.

FIG. 7 shows a practical example of the inhibiting circuit 20 used in the secondary beat signal cancel circuit 10 of the invention. As shown in FIG. 7, the edge signal $\Delta Y$ derived from the band-eliminating filter 22 is supplied to a terminal 25, and then is fed to a differential amplifier 23A formed of a pair of transistors $Q_1$ and $Q_2$. One transistor $Q_1$ produces at its collector an edge signal $\overline{\Delta Y}$ (FIG. 6F) the phase of which is inverted with respect to the edge signal $\Delta Y$, while the other transistor $Q_2$ produces at its collector an edge signal $\Delta Y$ in phase width the applied edge signal $\Delta Y$. The edge signal $\Delta Y$ having the same phase and the edge signal $\overline{\Delta Y}$ having the opposite phase are respectively supplied to a full-wave rectifier 23B which is formed of a pair of transistors $Q_3$ and $Q_4$, the emitters thereof being connected together. The full-wave rectified output ΔY' is produced at the connection point between the emitters of the transistors $Q_3$ and $Q_4$.

A capacitor 27 connected to the emitter sides of the pair of transistors $Q_3$ and $Q_4$ is used to slightly widen the pulse width of the full-wave rectified output ΔY'.

The AND circuit 24 is formed of a pair of transistors $Q_5$ and $Q_6$ in which the emitters thereof are connected together and also the collectors thereof are connected together. The full-wave rectified output ΔY' is supplied to the base of one transistor $Q_5$, while the envelope-detected output $S_E$ is supplied to the base of the other transistor $Q_6$. Accordingly during the period in which the level of the full-wave rectified output ΔY' is low, the transistor $Q_5$ is turned on so that the gated output developed at a terminal 28 led out from the connection point between the emitters of the transistors $Q_5$ and $Q_6$ becomes low in level. On the other hand, in the period during which the full-wave rectified output ΔY' is high in level, the transistor $Q_5$ is turned off so that the output having the level corresponding to the envelope-detected output $S_E$ is produced at the terminal 28, thus the level control circuit 17 as shown in FIG. 5 being controlled on the basis of the envelope-detected output $S_E$.

As set forth above, according to the circuit arrangement of the present invention, it is possible to completely cancel the secondary beat signal component $C_B$ leaked in the luminance signal Y. Also, in the case that no vertical correlation exists, the secondary beat signal cancel operation is inhibited on the basis of the edge signal ΔY so that the edge portion of the luminance signal Y is never deteriorated. As described above, in order to prevent the fine portion or edge portion of the luminance signal from being obscured, the secondary beat signal cancel operation is inhibited at the non-correlation portion of the luminance signal but the secondary beat signal cancel operation is carried out for a large area portion of the luminance signal, thus the picture quality being improved.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A circuit for reducing a secondary beat signal of a low-frequency converted chrominance signal leaked into a reproduced luminance signal, said secondary beat signal being produced because of the transmission of said luminance and chrominance signals through a non-linear transmission medium; said circuit comprising:

means for deriving a non-correlation signal having a leakage chrominance signal component superimposed thereon and an edge signal indicating a difference between luminance signal levels of corresponding points of succeeding horizontal scan lines;

means for detecting an amplitude of said chrominance signal;

level control means responsive to said detected amplitude of said chrominance signal for controlling an amplitude of said non-correlation signal in response to said detected amplitude of said chrominance signal to produce a signal of controlled amplitude such that said chrominance signal and said leakage chrominance signal component have equal amplitudes;

means responsive to said signal of controlled amplitude and said reproduced luminance signal for subtracting said signal of controlled amplitude from said reproduced luminance signal; and gate means for inhibiting output from said level control means in response to said edge signal.

2. The circuit according to claim 1, in which said deriving means includes a separating circuit having two circuit paths, one of said two circuit paths deriving said non-correlation signal and having a band pass filter and a limiting amplifier circuit serially coupled to said level control means and the other of said two circuit paths deriving said edge signal and having an amplifier, a band-eliminating filter and a full-wave rectifier serially coupled to said gate means, whereby the edge signal supplied to said gate means is full-wave rectified.

3. The circuit according to claim 2, in which said gate means includes two input terminals to which said full-wave rectified edge signal and said detected amplitude signal are respectively supplied so that said detected amplitude signal is inhibited from being applied to said level control means during a period in which said full-wave rectified edge signal occurs.

4. The circuit according to claim 3 further comprising delay line means connected between an input terminal of said luminance signal and said subtracting means, said delay line means having a time delay substantially equal to a time delay caused by said deriving means.

* * * * *